United States Patent
Joisten-Pieritz et al.

(10) Patent No.: US 11,971,080 B2
(45) Date of Patent: Apr. 30, 2024

(54) INTERNAL COMBUSTION ENGINE INCLUDING A MASS DIFFERENTIAL GEAR INCLUDING TWO BALANCE SHAFTS

(71) Applicant: DEUTZ Aktiengesellschaft, Cologne (DE)

(72) Inventors: Joachim Joisten-Pieritz, Kall (DE); Toni Kleinschmidt, Bruehl (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 17/607,992

(22) PCT Filed: Apr. 14, 2020

(86) PCT No.: PCT/EP2020/000083
§ 371 (c)(1),
(2) Date: Nov. 1, 2021

(87) PCT Pub. No.: WO2020/224796
PCT Pub. Date: Nov. 12, 2020

(65) Prior Publication Data
US 2022/0325776 A1    Oct. 13, 2022

(30) Foreign Application Priority Data
May 9, 2019   (DE) .............. 10 2019 003 288.8

(51) Int. Cl.
*F16F 15/26* (2006.01)
*F01M 11/02* (2006.01)
*F02B 75/06* (2006.01)

(52) U.S. Cl.
CPC .......... *F16F 15/267* (2013.01); *F01M 11/02* (2013.01); *F02B 75/06* (2013.01); *F01M 2011/028* (2013.01); *F16F 2232/02* (2013.01)

(58) Field of Classification Search
CPC ............ F01M 11/02; F01M 2011/021; F01M 2011/028; F02B 75/06; F16F 15/264–268; F16F 2232/02; F16F 15/265; F16F 15/26
See application file for complete search history.

(56) References Cited

U.S. PATENT DOCUMENTS 3,094,190 A * 6/1963 Hulsing ................ F02F 7/0031
                                                          123/196 R
3,710,774 A * 1/1973 Weseloh ................ F02B 67/04
                                                              184/6.28

(Continued)

FOREIGN PATENT DOCUMENTS

CN       102128065 A    7/2011
DE       41 28432 A1    3/1993

(Continued)

OTHER PUBLICATIONS

International Search Report for PCT/EP2020/000083, dated Sep. 25, 2020.

*Primary Examiner* — Hung Q Nguyen
*Assistant Examiner* — Mark L. Greene
(74) *Attorney, Agent, or Firm* — Davidson Kappel LLC

(57) ABSTRACT

An internal combustion engine includes a crankcase in which a crankshaft is rotatably mounted in bearings including bearing covers, to which at least one connecting rod carrying a piston is linked. The piston is movable in a cylinder covered by a cylinder head forming a combustion chamber and gas exchange valves are arranged in the cylinder head, which are actuated by at least one camshaft, which is connected to a gear train gear wheel situated on the crankshaft via a differential gear. A mass differential gear including two balance shafts is present. The mass differential gear is situated in a gear frame and attached to the crankcase below the crankshaft and driven by a mass shaft drive gear situated on the crankshaft, which is arranged axially essen- (Continued)

tially next to the gear train gear wheel/idler gear. The gear train gear wheel/idler gear is arranged on the main bearing cover.

5 Claims, 4 Drawing Sheets

(56) References Cited

U.S. PATENT DOCUMENTS

| | | | |
|---|---|---|---|
| 5,107,802 A * | 4/1992 | Yagi | F01L 13/0063 123/90.31 |
| 8,418,669 B2 * | 4/2013 | Katayama | F16F 15/265 123/192.1 |
| 8,997,709 B2 | 4/2015 | Raab et al. | |
| 2003/0106518 A1 | 6/2003 | Purcell et al. | |
| 2010/0132654 A1 * | 6/2010 | Lee | F02B 75/06 123/192.2 |
| 2011/0168125 A1 | 7/2011 | Momosaki et al. | |
| 2011/0253091 A1 | 10/2011 | Hashimoto et al. | |

FOREIGN PATENT DOCUMENTS

| | | | | |
|---|---|---|---|---|
| DE | 199 36103 A1 | 2/2001 | | |
| DE | 102 40713 A1 | 3/2004 | | |
| DE | 102012001043 A1 * | 8/2012 | | F16F 15/267 |
| DE | 10 2011 075897 A1 | 11/2012 | | |
| EP | 0916833 A2 | 5/1999 | | |
| JP | S54142788 U | 10/1979 | | |
| JP | S 58 20750 U | 2/1983 | | |
| JP | H0616748 U | 3/1994 | | |
| JP | 2001280422 A | 10/2001 | | |
| JP | 2003130136 A | 5/2003 | | |
| JP | 2007239521 A | 9/2007 | | |
| KR | 20040034834 A * | 4/2004 | | |

* cited by examiner

INTERNAL COMBUSTION ENGINE INCLUDING A MASS DIFFERENTIAL GEAR INCLUDING TWO BALANCE SHAFTS

The present disclosure relates to an internal combustion engine including a crankcase in which a crankshaft is rotatably mounted, to which at least one connecting rod carrying a piston is linked, the piston being movable in a cylinder covered by a cylinder head, forming a combustion chamber, and gas exchange valves being situated in the cylinder head, which are actuated by at least one camshaft connected via a gear mechanism to a gear train gear wheel situated on the crankshaft, a mass differential gear including two balance shafts being present.

BACKGROUND

Presently, mass differential gears are driven via gear wheels mounted on the crank webs. By virtue of the system, these gear wheels are very large and difficult to mount. This complex and cost-intensive drive variant is determined by a drastically limited installation space. Lubricating oil pumps are partially driven via idler gear bearings attached in the crankcase. This results in higher tolerance chains and the problem of an unfavorable lubricating oil supply of the idler gear bearings. In some instances, both systems have to be installed at the same time to be able to simultaneously drive the oil pump and a mass differential gear.

Such an internal combustion engine is furthermore known from DE 41 28 432 A1. In this internal combustion engine, a mass differential gear is installed, which is directly integrated into the crankcase of the internal combustion engine. On the one hand, this yields the option of manufacturing the bearing positions for the balance shafts of the mass differential gear during the machining of the crankcase in a shared operation, while the bearing positions for, for example, the crankshaft, idler gears and camshaft are being machined or manufactured. In this way, it is possible to maintain the distances of the individual bearing positions with respect to one another with great precision. On the other hand, a mass differential gear is only required as needed, in particular in internal combustion engines which are used as industrial engines, commercial vehicle engines or construction equipment engines. In the event that no mass differential gear is required, at least the machining of the bearing positions for the mass differential gear in the crankcase represents additional efforts which incur additional costs.

A device is known from DE 102 40 713 A1 for balancing the mass forces for an internal combustion engine including two balance shafts which are operated in opposite directions at twice the crankshaft speed and which are situated beneath the crankshaft within the oil pan attached beneath the crankcase.

The disadvantage of this is that the described variants are bulky and expensive.

SUMMARY

It is an object of the present disclosure to provide an internal combustion engine which represents an installation space-optimized and cost-effective drive variant for driving a lubricating oil pump or a mass differential gear, or both, in an internal combustion engine.

The present disclosure provides that mass differential gear, which is situated in a gear frame, is attached to the crankcase beneath the crankshaft and is driven by a driving gear wheel situated on the crankshaft. As a result of this design, initially no unnecessary machining processes are required on the crankcase, apart from attachment threads for the gear frame which may be manufactured with little complexity.

Here, an idler gear bearing for driving a lubricating oil pump and/or a mass differential gear is advantageously integrated into the main bearing block, making it possible for an oil pump and/or a mass differential gear to be driven with only limited available installation space. For lubricating the idler gear, the necessary amount of oil is provided by the main bearing block. In one alternative refinement, it is provided that the idler gear is equipped with a rolling bearing, so that no active lubricant supply from the bearing block is necessary. Another advantage is that both angle errors of the gear wheels and the flank clearance with respect to the driving gear wheel present on the crankshaft are minimized. Another advantageous refinement provides for the lubricating oil supply of the idler gear bearing to be covered from the lubricating oil supply of the main bearing on the crankcase side. One variant provides for the supply borehole of the crankcase-side bearing block to be partially drilled and the idler gear bearing integrated into the main bearing cover is forwarded. Another variant provides for the oil supply of the idler gear bearing to be implemented by a bearing shell installed on the crankcase side, including an integrated rear-side oil supply groove. Another variant provides for one of the main bearing screw pipes to be supplied with compressed oil for supplying oil to the idler gear bearing, the oil being fed into the bearing pin for lubricating the idler gear.

In one refinement of the present disclosure, two balance shaft gear wheels meshing with one another are provided, and a driving gear wheel, which is engaged with the mass drive wheel via a balance shaft idler gear, is situated axially next to a balance shaft gear wheel. This combination, on the one hand, allows the gear ratio which is to be set to be implemented and, on the other hand, the center distance between the crankshaft and the two balance shafts is bridged by the balance shaft idler gear.

In another embodiment of the present disclosure, an oil pump gear wheel is directly engaged with the gear train gear wheel.

BRIEF DESCRIPTION OF THE DRAWINGS

Further advantageous embodiments of the present disclosure may be derived from the description of the drawings, in which an exemplary embodiment shown in the figures is described in greater detail:

FIG. 1b shows a cross-sectional view along A-A in FIG. 1a;

FIG. 2b shows a cross-sectional view along B-B in FIG. 2a;

FIG. 2c shows a cross-sectional view along C-C in FIG. 2a;

FIG. 3b shows a cross-sectional view along A-A in FIG. 1a;

FIG. 4b shows a cross-sectional view along B-B in FIG. 4a; and

FIG. 4c shows a cross-sectional view along C-C in FIG. 4a.

DETAILED DESCRIPTION

Figure 1A:
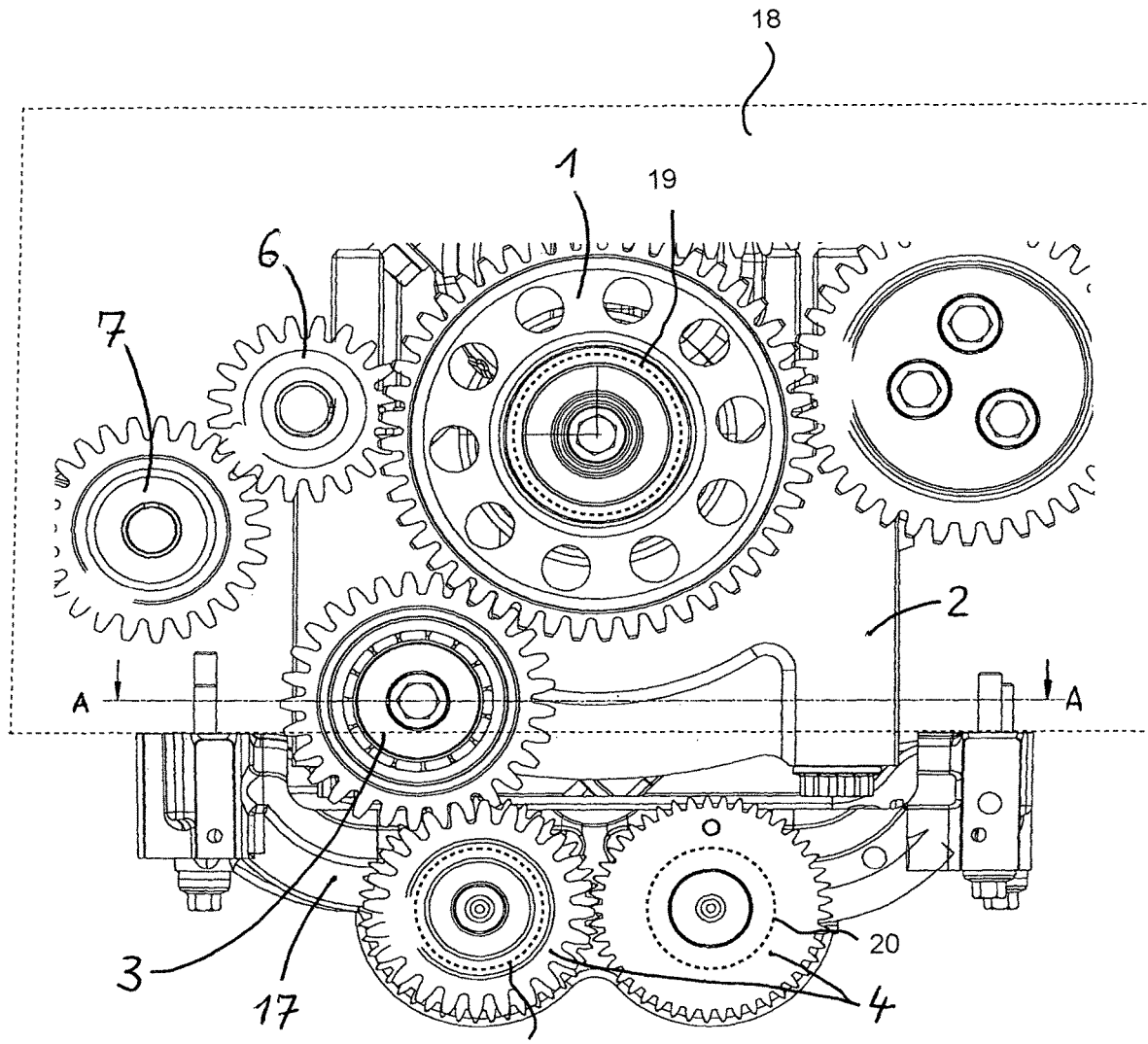
FIG. 1a shows a front view of the internal combustion engine including a partially mounted gear train including a differential gear and a rolling bearing-supported idler gear.
Figure 1B:
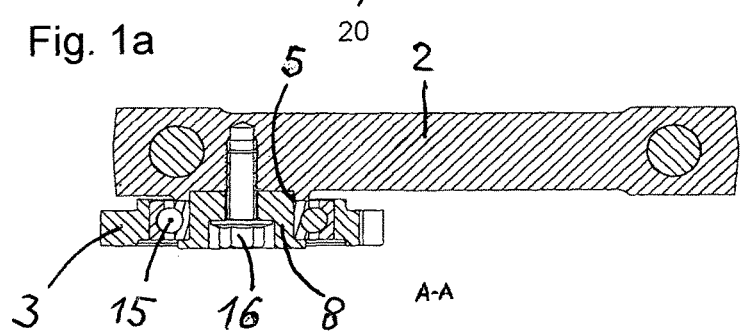

A crankshaft gear wheel 1 is attached to the crankshaft 19 and is operatively connected to mass balance shafts 20 with the aid of an idler gear screwed onto bearing cover 2. A centering receptacle 5 is situated in the bearing cover at bearing cover 2. Furthermore, crankshaft gear wheel 1 attached at the crankshaft is operatively connected to the idler gear of an oil pump 6, which is in turn operatively connected to the drive wheel of the oil pump 7. The screwed-on bearing pin 8 accommodates the rolling bearing-supported idler gear 3 including screw 16 and rolling bearing 15 screwed onto bearing cover 2.

Figure 2A:
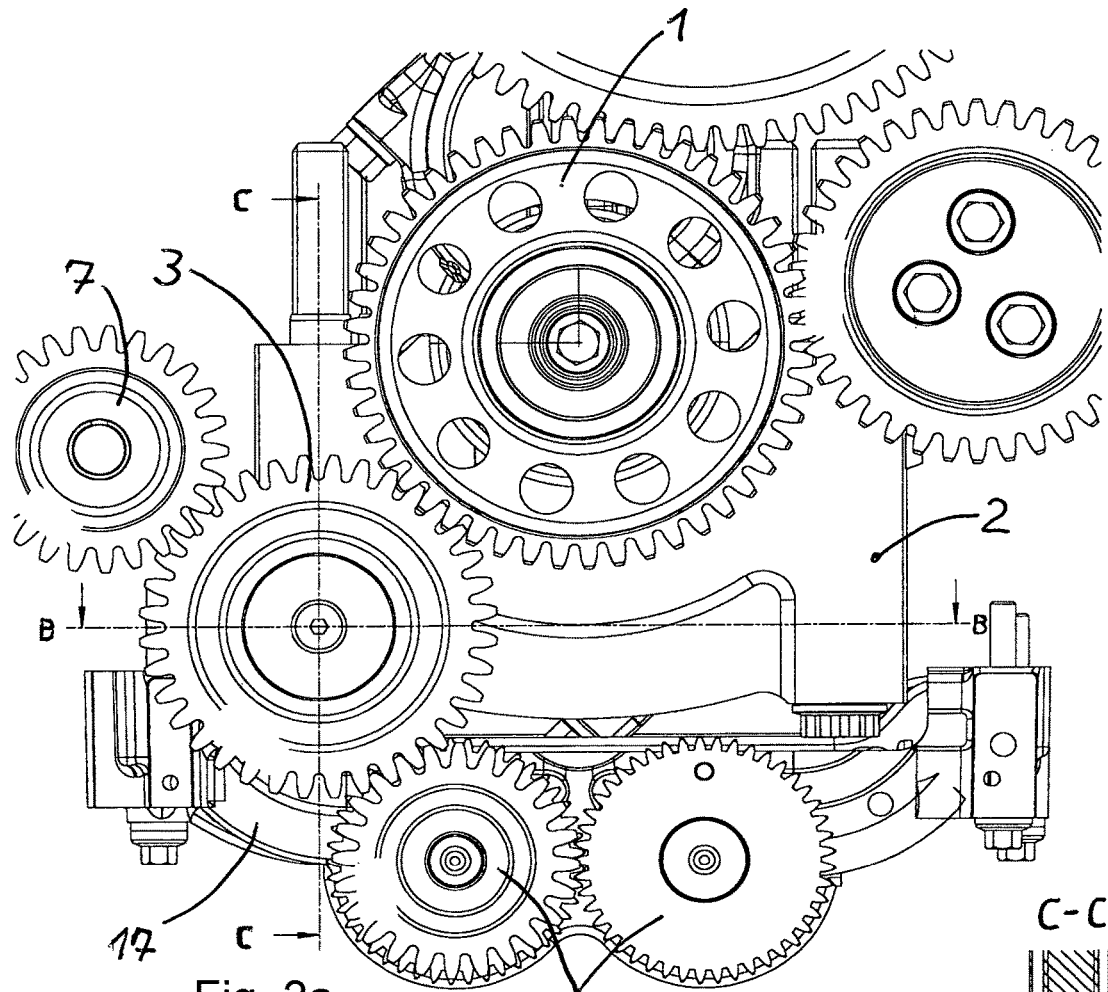
FIG. 2a shows a front view of the internal combustion engine including a partially mounted gear train including a differential gear and a friction bearing-supported idler gear.
Figure 2B:
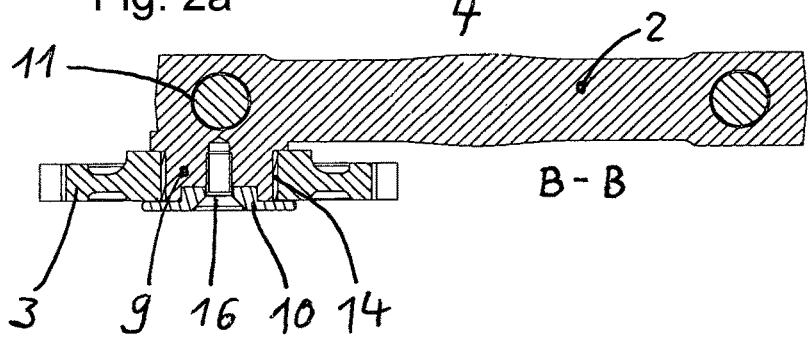
Figure 2C:
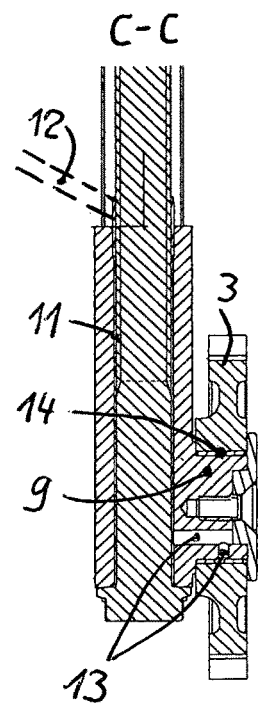

In the view according to FIG. 2a, a front view of the internal combustion engine including a partially mounted gear train including a differential gear and a friction bearing-supported idler gear is shown.

The mass differential gear is driven via a balance shaft idler gear, which in turn drives a drive wheel situated axially upstream from a balance shaft gear wheel, which is engaged with a second balance shaft gear wheel.

These two balance shaft gear wheels 4 are connected to the mass balance shafts 20 (FIG. 1a) mounted in gear frame 17 of the mass differential gear. This gear frame is screwed directly to the underside of the crankcase 18 (FIG. 1a). Crankshaft gear wheel 1 is attached to the crankshaft and is operatively connected to mass balance shafts 204 with the aid of idler gear 3 screwed onto bearing cover 2. Furthermore, crankshaft gear wheel 1 attached to the crankshaft is operatively connected to idler gear 3, which is in turn operatively connected to the drive wheel of the oil pump 7. The cast-on bearing pin 9 accommodates a friction bearing-supported idler gear 3, and which is screwed onto bearing cover 2 using thrust washer 10 and screw 16. The annular gap for oil supply 11 is supplied with oil for oil supply 13 of friction bearing 14 from annular gap 11 with the aid of oil flow 12 from bearing block borehole into the annular gap.

Figure 3A:
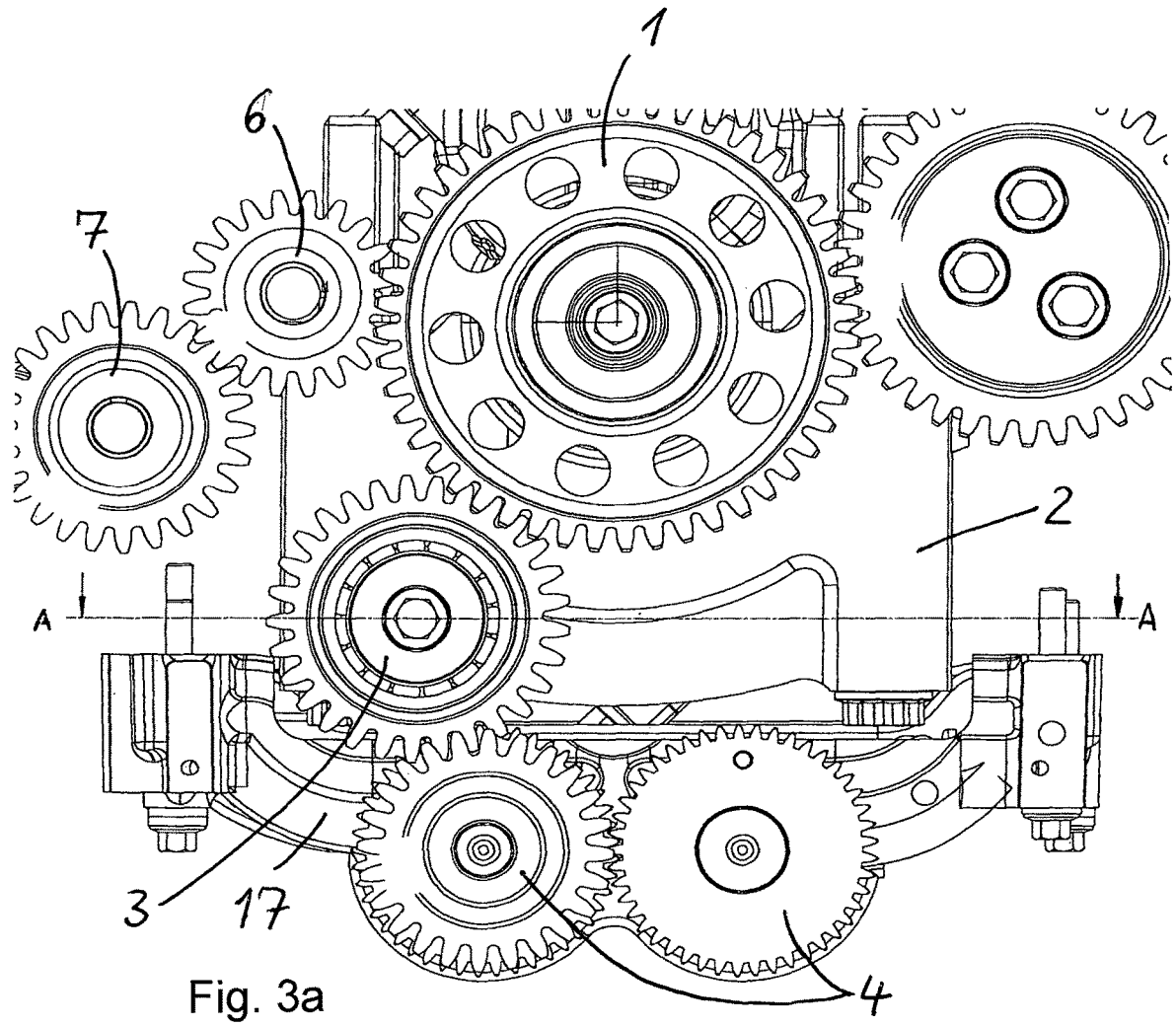
FIG. 3a shows a front view of the internal combustion engine including a partially mounted gear train including a differential gear and a rolling bearing-supported idler gear.
Figure 3B:
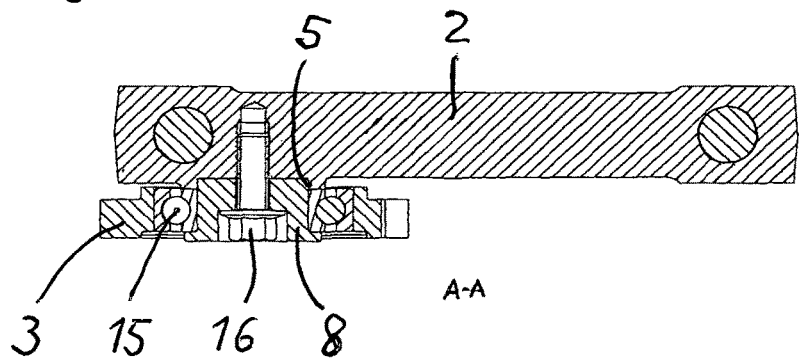

The representation in FIG. 3a shows a front view of the internal combustion engine including a partially mounted gear train including a differential gear and a rolling bearing-supported idler gear 3. Crankshaft gear wheel 1 is attached to the crankshaft and is operatively connected to mass balance shafts 204 with the aid of the idler gear screwed onto bearing cover 2. A centering receptacle 5 is situated in the bearing cover at bearing cover 2. Furthermore, crankshaft gear wheel 1 attached to the crankshaft is operatively connected to the idler gear of oil pump 6, which is in turn operatively connected to the drive wheel of the oil pump 7. The screwed-on bearing pin 8 accommodates a rolling bearing-supported idler gear 3, including screw 16 and rolling bearing 15 screwed onto bearing cover 2.

Figure 4A:
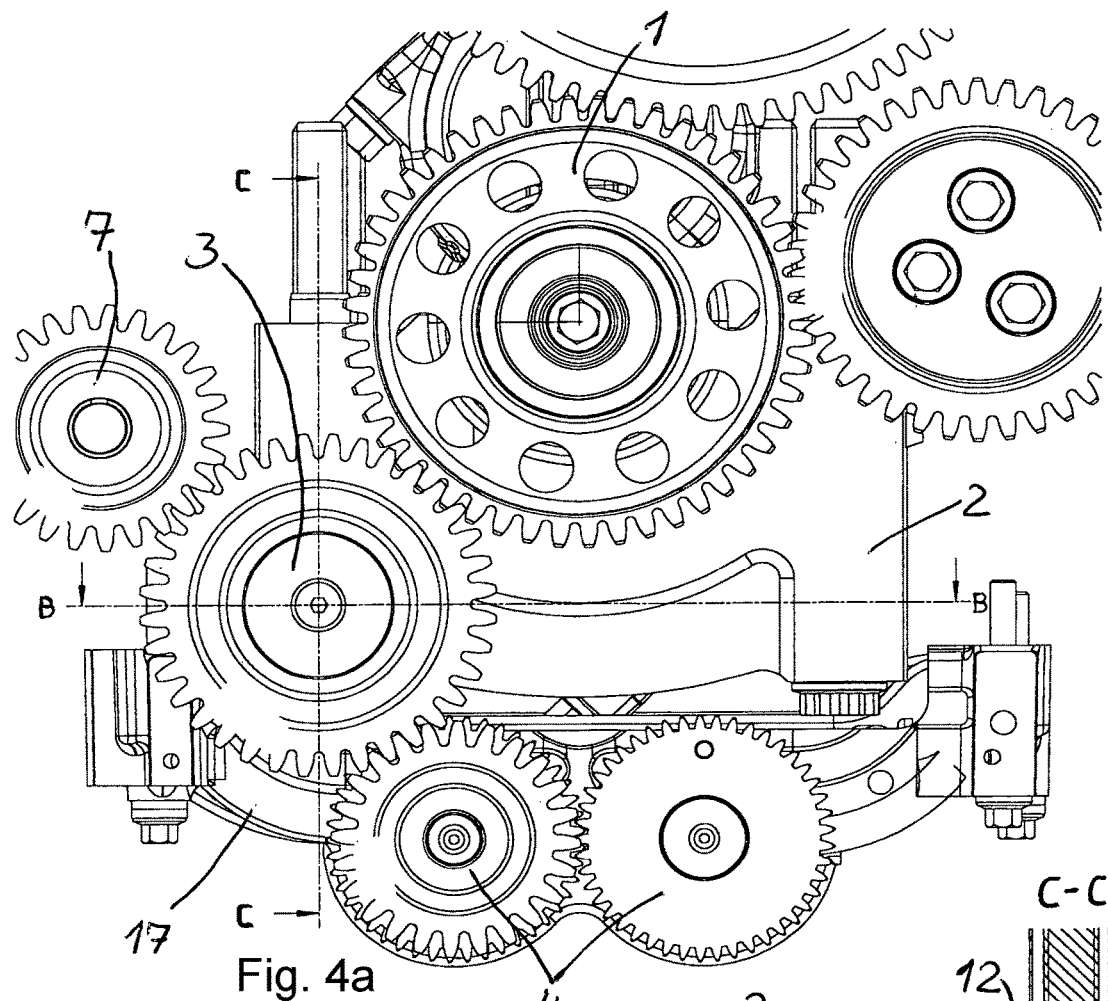
FIG. 4a shows a front view of the internal combustion engine including a partially mounted gear train including a differential gear and a friction bearing-supported idler gear.
Figure 4B:
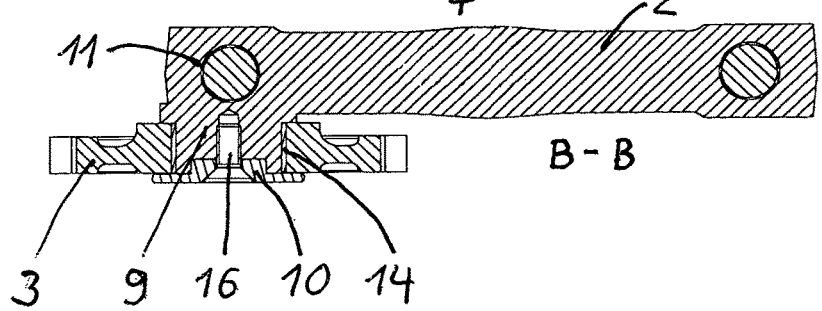
Figure 4C:
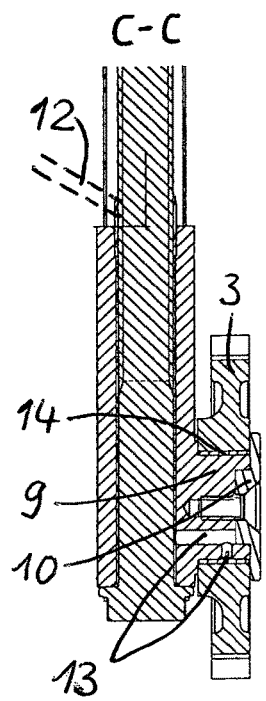

FIG. 4a shows a front view of the internal combustion engine including a partially mounted gear train including a differential gear and a friction bearing-supported idler gear 3. Crankshaft gear wheel 1 is attached to the crankshaft and is operatively connected to mass balance shafts 204 with the aid of idler gear 3 screwed onto bearing cover 2. Furthermore, crankshaft gear wheel 1 attached to the crankshaft is operatively connected to idler gear 3, which is in turn operatively connected to the drive wheel of oil pump 7. The cast-on bearing pin 9 accommodates a friction bearing-supported idler gear 3 which is screwed onto bearing cover 2 with the aid of thrust washer 10 and screw 16. The annular gap for oil supply 11 is supplied with oil for oil supply 13 of friction bearing 14 from annular gap 11 with the aid of oil flow 12 from bearing block borehole into the annular gap.

LIST OF REFERENCE NUMERALS

1 crankshaft gear wheel
2 bearing cover
3 idler gear screwed onto bearing cover
4 mass balance shafts gears
5 centering receptacle in bearing cover
6 oil pump idler gear
7 drive wheel of oil pump
8 bearing pin screwed on
9 bearing pin cast onto bearing cover
10 thrust washer
11 annular gap for oil supply
12 oil flow from bearing block borehole into annular gap
13 oil supply of friction bearing from annular gap
14 friction bearing of idler gear
15 rolling bearing of idler gear
16 screw
17 gear frame
18 crankcase
19 crankshaft
20 mass balance shaft

What is claimed is:

1. An internal combustion engine comprising:
a crankcase;
a crankshaft is rotatably mounted in the crankcase;
a crankshaft gear situated on the crankshaft;
a gear frame fixed to a bottom of the crankcase;
a mass differential gear situated in the gear frame beneath the crankshaft gear;
an intermediate gear; and
a bearing cover connected to the crankcase via main bearing screws extending through main bearing screw pipes of the bearing cover, the mass differential gear being driven by the crankshaft gear via the intermediate gear, the intermediate gear being situated at the bearing cover,
wherein the intermediate gear is mounted on the bearing cover via an intermediate gear bearing,
wherein one of the main bearing screw pipes is supplied with compressed oil for supplying oil to the intermediate gear bearing.

2. The internal combustion engine as recited in claim 1 wherein the intermediate gear is an idler gear fastened to the bearing cover by a fastener held in the bearing cover.

3. The internal combustion engine as recited in claim 2 wherein the idler gear includes a bearing pin fixed to the bearing cover by the fastener and the intermediate gear bearing is one of at least one bearing for rotatably coupling the idler gear to the bearing cover.

4. The internal combustion engine as recited in claim 1 further comprising a drive wheel of an oil pump operatively connected to the crankshaft gear.

5. The internal combustion engine as recited in claim 1, wherein the intermediate gear is an idler gear and a lubricating oil supply of the intermediate gear bearing of the idler gear is tapped from a lubricating oil supply of a main bearing on a crankcase-side in such a way that a supply borehole of a crankcase-side bearing block is partially drilled by which oil is forwarded to the idler gear.

\* \* \* \* \*